United States Patent
Wu

(10) Patent No.: US 9,351,888 B2
(45) Date of Patent: *May 31, 2016

(54) FRONT SUSPENSION SYSTEM FOR AN ELECTRIC WHEELCHAIR

(71) Applicant: ENERGY CONTROL LIMITED, Tortola (VG)

(72) Inventor: Donald P. H. Wu, Hsinchu County (TW)

(73) Assignee: Energy Control Limited, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 14/484,968

(22) Filed: Sep. 12, 2014

(65) Prior Publication Data

US 2016/0074263 A1 Mar. 17, 2016

(51) Int. Cl.
*A61G 5/06* (2006.01)
*B60G 3/14* (2006.01)
*B60G 11/15* (2006.01)
*A61G 5/04* (2013.01)
*B60G 15/06* (2006.01)
*A61G 5/10* (2006.01)

(52) U.S. Cl.
CPC *A61G 5/06* (2013.01); *A61G 5/043* (2013.01); *B60G 3/14* (2013.01); *B60G 11/15* (2013.01); *B60G 15/062* (2013.01); *A61G 2005/1078* (2013.01); *A61G 2005/1089* (2013.01)

(58) Field of Classification Search
CPC . A61G 5/06; A61G 5/043; A61G 2005/1078; A61G 2005/1089; B60G 3/14; B60G 11/15; B60G 15/062
See application file for complete search history.

(56) References Cited

U.S. PATENT DOCUMENTS

| | | | | |
|---|---|---|---|---|
| 2,782,027 A | * | 2/1957 | Bergquist et al. | 267/275 |
| 2,784,963 A | * | 3/1957 | Whalen | 267/5 |
| 3,750,774 A | * | 8/1973 | Trapp | 180/193 |
| 3,922,024 A | * | 11/1975 | Burkhardt et al. | 305/134 |
| 7,306,247 B2 | * | 12/2007 | Wu | 280/124.128 |
| 7,975,794 B2 | * | 7/2011 | Simmons | 180/193 |
| 8,474,843 B2 | * | 7/2013 | Mills | 280/124.128 |
| 9,072,640 B2 | * | 7/2015 | Wu | A61G 5/06 |
| 2005/0000742 A1 | * | 1/2005 | Mulhern et al. | 180/65.5 |
| 2007/0152427 A1 | * | 7/2007 | Olsen | 280/649 |
| 2008/0116660 A1 | * | 5/2008 | Nicholls | 280/286 |
| 2013/0328282 A1 | * | 12/2013 | Porcheron | 280/124.104 |

* cited by examiner

Primary Examiner — Joseph Rocca
Assistant Examiner — Timothy Wilhelm
(74) *Attorney, Agent, or Firm* — Wang Law Firm, Inc.

(57) ABSTRACT

A front suspension system for an electric wheelchair is disposed between the frame of the electric wheelchair and each of the front wheels, and has two ends pivoted to the front pivot shaft and a corresponding one of the front wheels, respectively. An elasticity resistance member is sleeved onto the front pivot shaft and has two ends connected to the front wheel retainer and the abutting member of the frame, respectively. When the front wheels encounters bumpy road and makes the front wheel retainer pivot, the elasticity resistance member will be compressed to produce a reaction force toward the front wheel retainer and the abutting member of the frame, respectively, so that the front wheel retainer is pressed down to keep pressing against the flat bearing surface, and the frame is also pressed downward to prevent tipping backward.

4 Claims, 9 Drawing Sheets

FRONT SUSPENSION SYSTEM FOR AN ELECTRIC WHEELCHAIR

BACKGROUND OF THE INVENTION

1. Field of the Invention

The present invention relates to a suspension system, and more particularly to a front suspension system for an electric wheelchair.

2. Description of the Prior Art

A suspension system generally comprises a shock absorbing device and links and used to reduce the bounce or impact to the vehicle caused by a bumpy road, so as to keep the passengers comfortable.

FIG. 1 shows a frame structure of an electric wheelchair, wherein the frame structure 10 essentially includes a main frame 11, and two front wheel retainers 12 and two rear wheel retainers 13 which are disposed at two sides of the front and rear ends of the main frame 11, respectively, to fix the front and rear wheels 14, 15. The front suspension system of the frame structure 10 includes the front wheel retainers 12, and a spring 16 disposed on each of the front wheel retainers 12. With the elasticity of the spring 16, the front wheel retainers 12 can move up and down along with the front wheels 14 to absorb the bounce caused by bumpy road. When the wheelchair moves a flat and smooth or a little bumpy road, the direction in which the front wheel retainers 12 presses the springs 16 is the same as the direction that the springs 16 are compressed, the springs 16 can play the best role in damping and shock absorbing.

When moving on a very bumpy road, the front wheels 14 bounce up and down and cause movement of the front wheel retainers 12, the front wheel retainers 12 will press against the springs 16 in an inclined manner. Therefore, the front wheel retainers 12 press in a lateral direction against the springs 16, namely, the direction in which the front wheel retainers 12 apply the press force is different from the direction that the springs 16 are compressed, which will cause bending of the springs 16, and the damping effect is adversely affected. Besides, the more bumpy the road is, the greater the upward pressing force applied to the front wheel retainers 12 will be. When the upward pressing force applied to the front wheel retainers 12 is great, and the elastic force of the springs 16 is the only force to counteract the upward pressing force, once the elastic force of the springs 16 is not great enough to counteract the upward pressing force, the frame structure 10 of the wheelchair will tip backward, and the wheelchair can't be able to move safely on the bumpy road.

The present invention has arisen to mitigate and/or obviate the afore-described disadvantages.

SUMMARY OF THE INVENTION

The primary objective of the present invention is to provide a front suspension system for an electric wheelchair, which is capable of preventing the frame of the wheelchair from tipping over when moving on a bumpy road.

To achieve the above objective, a front suspension system for an electric wheelchair in accordance with the present invention is assembled onto a frame of the electric wheelchair. On the frame is disposed a seat, at two ends of the frame are disposed two front wheels and two rear wheels, respectively. To each of two sides between the two ends of the frame is pivotally fixed an assembling frame via a pivot. A drive unit is fixed to each of the assembling frames and located at one side of the corresponding pivot, and to each of the drive units is fixed a drive wheel. Each of the front wheels is connected to the frame via a front suspension system, the front suspension system comprise a front pivot shaft with one end fixed to the frame, and a front wheel retainer with one end pivoted to another end of the front pivot shaft, the front wheel retainer has another end fixed to a corresponding one of the front wheels. The front suspension system is characterized in that:

an abutting member is on the frame;

a surface of the front wheel retainer faces toward the frame and is formed with a driving portion;

between the frame and the front wheels retainer is disposed an elasticity resistance member which is sequentially formed with a driving section, an elasticity resistance section and a stop section, the elasticity resistance section is a spiral structure, and the driving section and the stop section are connected to two ends of the elasticity resistance section, respectively, and extend in two different directions, the elasticity resistance member is sleeved onto the front pivot shaft and located between the frame and the front wheel retainer, the driving section of the elasticity resistance member is connected to the driving portion of the front wheel retainer, and the stop section is stopped against the abutting member; and a front shock absorber has one end pivoted to the front wheel retainer, and has another end pivoted to another side of the pivot of the assembling frame, an axis of the front shock absorber is located at angle ranging from 0-10 degrees with respect to the first direction.

The elasticity resistance member is disposed between the frame and the front wheel retainer and has two ends connected to the front wheel retainer and the abutting member of the frame, respectively. When the front wheels encounters bumpy road and makes the front wheel retainer pivot, the elasticity resistance member will be compressed to produce a reaction force toward the front wheel retainer and the abutting member of the frame, respectively, so that the front wheel retainer is pressed down to keep pressing against the flat bearing surface, and the frame is also pressed downward to prevent tipping backward.

DETAILED DESCRIPTION OF THE PREFERRED EMBODIMENTS

Figure 1:
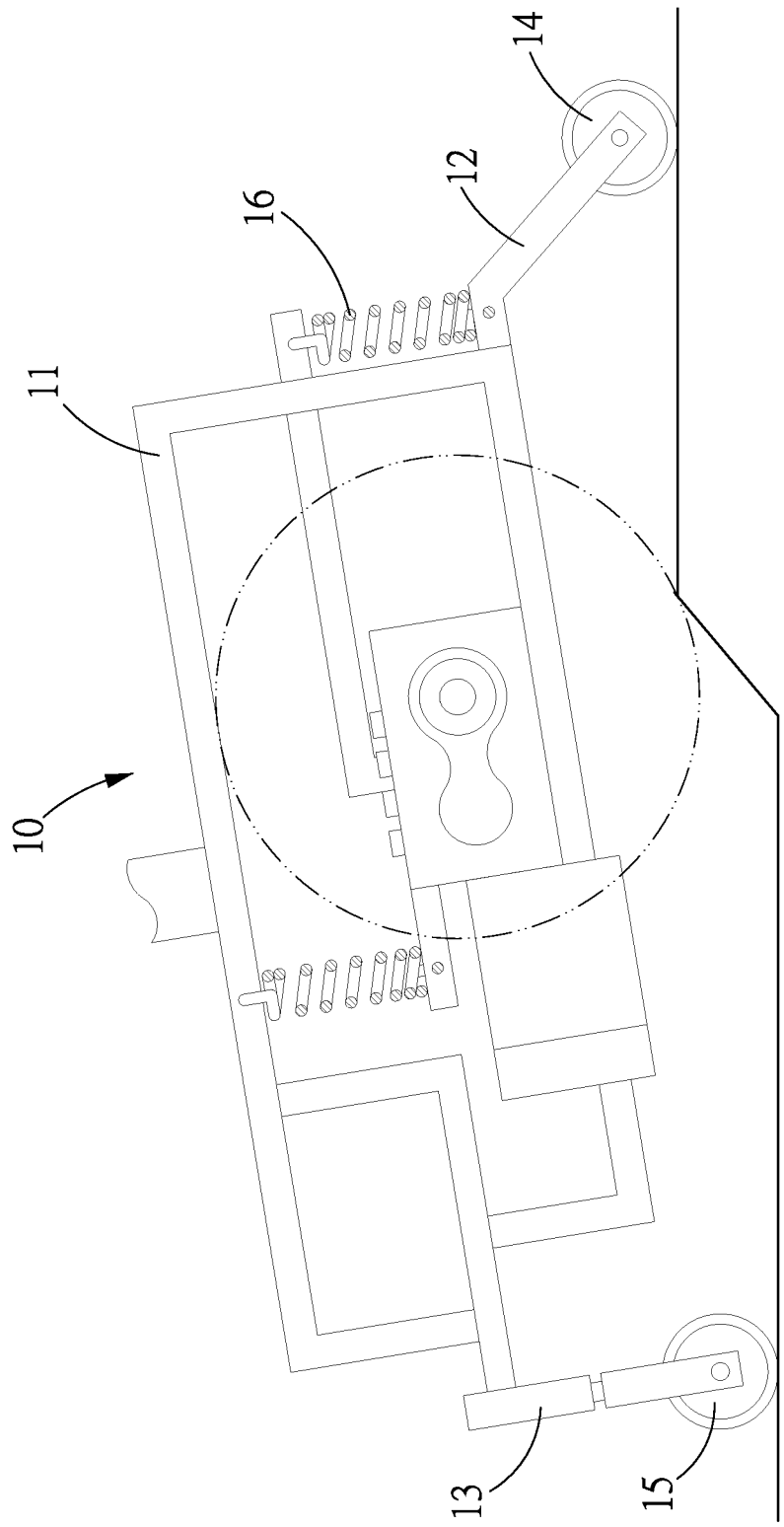
FIG. 1 is an illustrative view of a frame of a conventional electric wheelchair.
Figure 2:
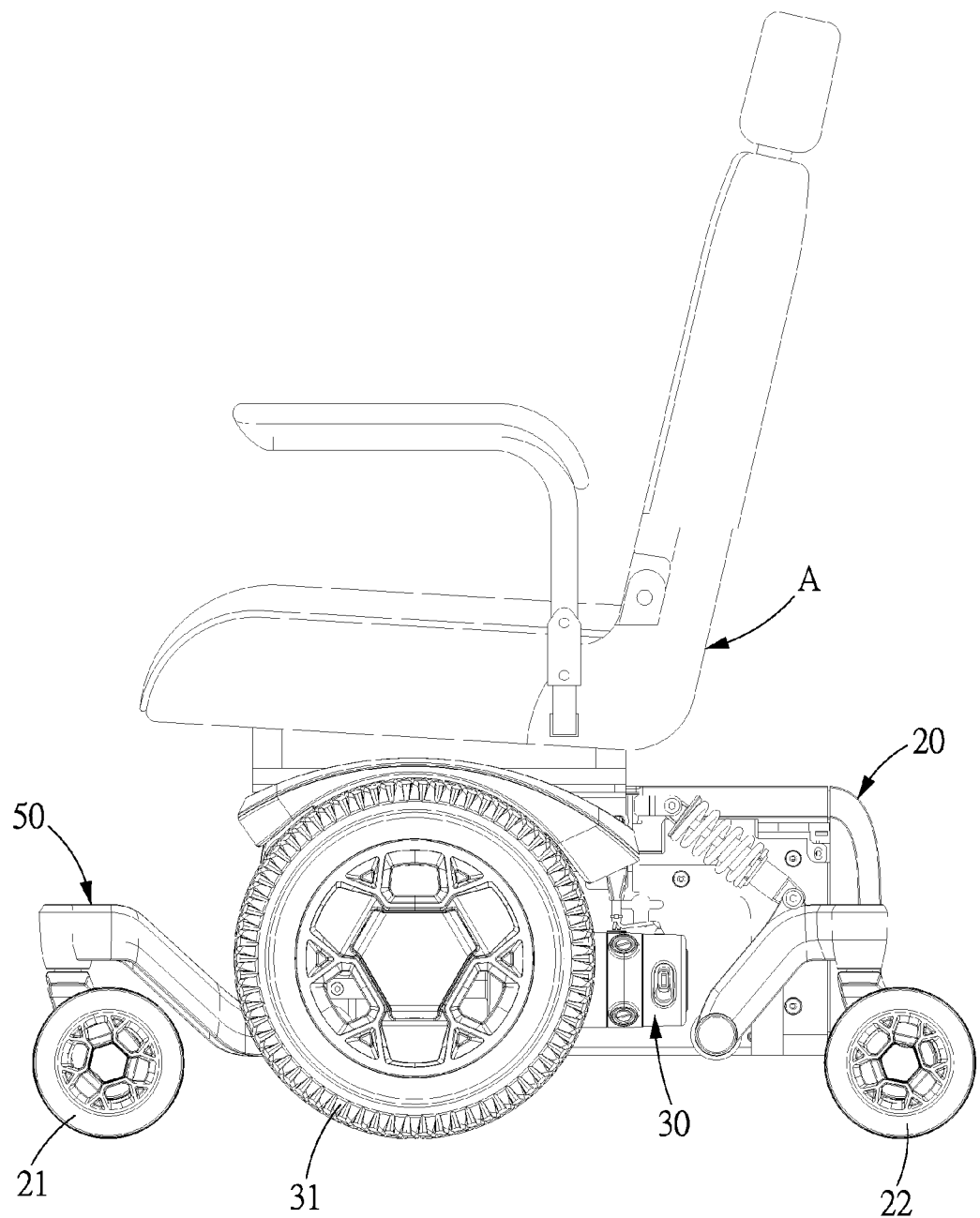
FIG. 2 is an operational view of a front suspension system for an electric wheelchair in accordance with a preferred embodiment of the present invention.
Figure 3:
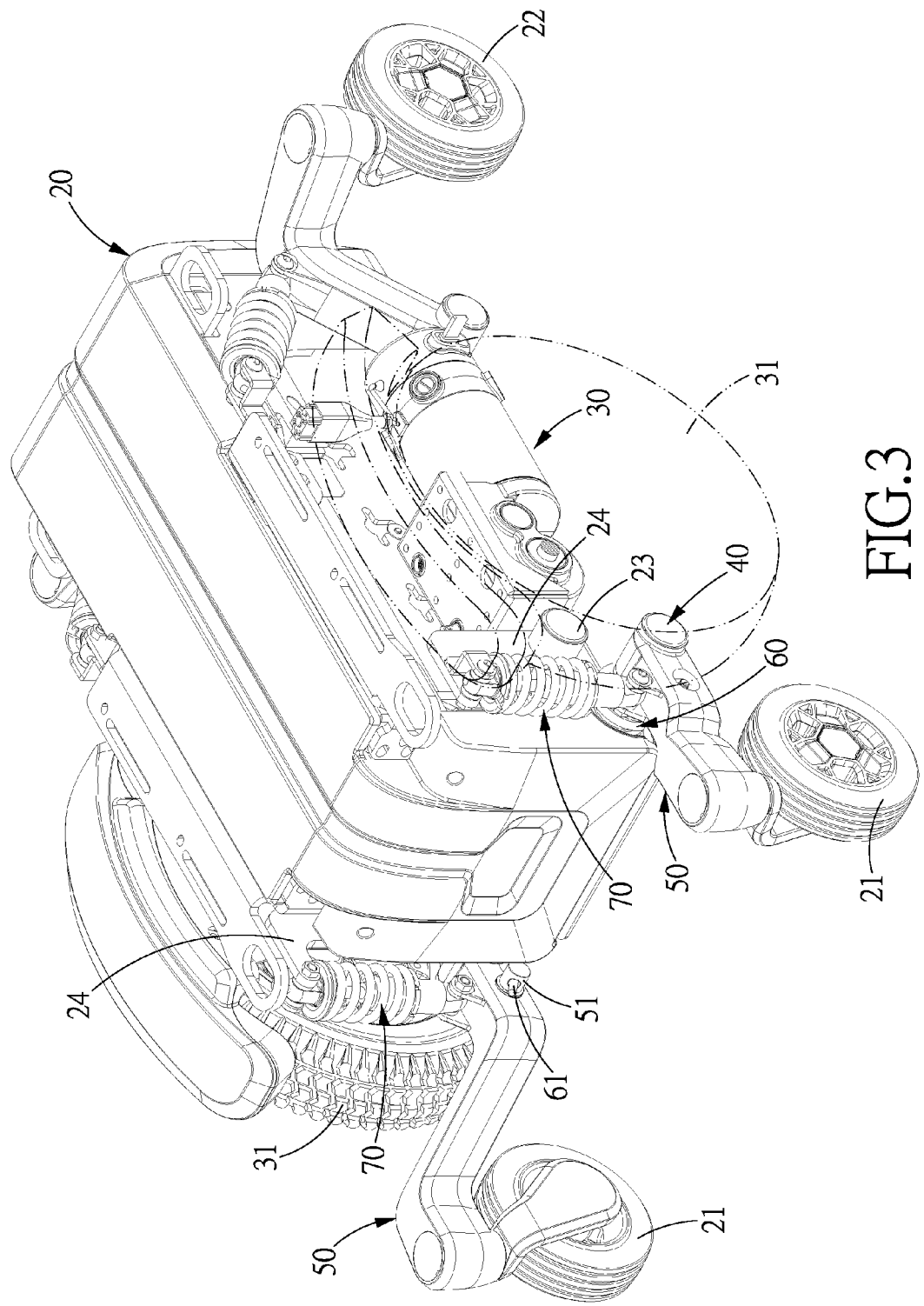
FIG. 3 is a perspective view of the front suspension system for an electric wheelchair in accordance with the present invention.
Figure 4:
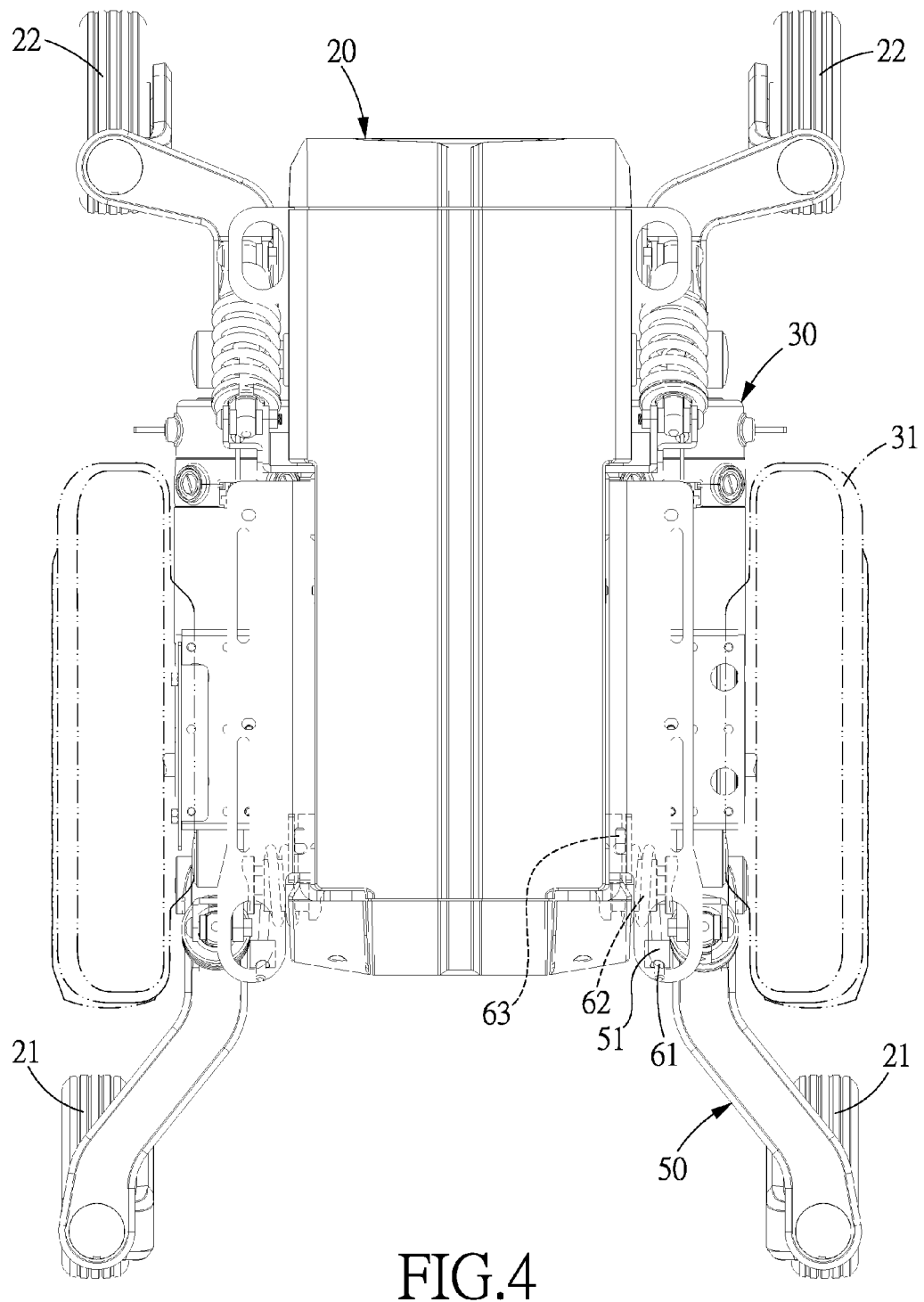
FIG. 4 is a top view of the front suspension system for an electric wheelchair in accordance with the present invention.

The present invention will be clearer from the following description when viewed together with the accompanying drawings, which show, for purpose of illustrations only, the preferred embodiment in accordance with the present invention.

Referring to FIGS. 2-9, a front suspension system for an electric wheelchair in accordance with a preferred embodiment of the present invention is to be assembled onto a frame 20 of the electric wheelchair. On the frame 20 is disposed a seat A. At two ends of the frame 20 are disposed two front wheels 21 and two rear wheels 22, respectively. To each of two sides between the two ends of the frame 20 is pivotally fixed an assembling frame 24 via a pivot 23. A drive unit 30 is fixed to each of the assembling frames 24 and located at one side of the corresponding pivot 23, and to each of the drive units 30 is fixed a drive wheel 31. Each of the front wheels 21 is connected to the frame 20 via a front suspension system, and on the frame 20 is further fixed an abutting member 25.

The front suspension system comprises: a front pivot shaft 40, a front wheel retainer 50, an elasticity resistance member 60, and a front shock absorber 70.

The front pivot shaft 40 has one end fixed to the frame 20, and the position of the front pivot shaft 40 on the frame 20 in a first direction D1 is lower than a position of the abutting member 25 on the frame 20 in the first direction D1.

The front wheel retainer 50 has one end pivoted to another end of the front pivot shaft 40 and another end fixed to a corresponding one of the front wheels 21. A surface of the front wheel retainer 50 faces toward the frame 20 and is formed with a driving portion 51.

The elasticity resistance member 60 is sequentially formed with a driving section 61, an elasticity resistance section 62, and a stop section 63. The elasticity resistance section 62 is a spiral structure, and the driving section 61 and the stop section 63 are connected to two ends of the elasticity resistance section 62, respectively, and extend in two different directions. The stop section 63 includes an extending portion 631 and a force applying portion 632. A direction along which the extending portion 631 extends is defined as a first direction D1, and a direction perpendicular to the first direction D1 is defined as a second direction D2. The force applying force 632 extends in the second direction D2. The elasticity resistance member 60 is sleeved onto the front pivot shaft 40 and located between the frame 20 and the front wheel retainer 50. The driving section 61 of the elasticity resistance member 60 is connected to the driving portion 51 of the front wheel retainer 50. In this embodiment, the driving portion 51 is formed with a through hole 511 in which is inserted the driving section 61, and the force applying portion 632 of the stop section 63 is stopped against the abutting member 25.

The front shock absorber 70 has one end pivoted to the front wheel retainer 50, and has another end pivoted to another side of the pivot 23 of the assembling frame 24. The axis of the front shock absorber 70 is located at angle θ ranging from 1-10 degrees with respect to the first direction D1. In this embodiment, the angle θ is 4-6 degrees, and preferably 4 degrees.

Figure 5:
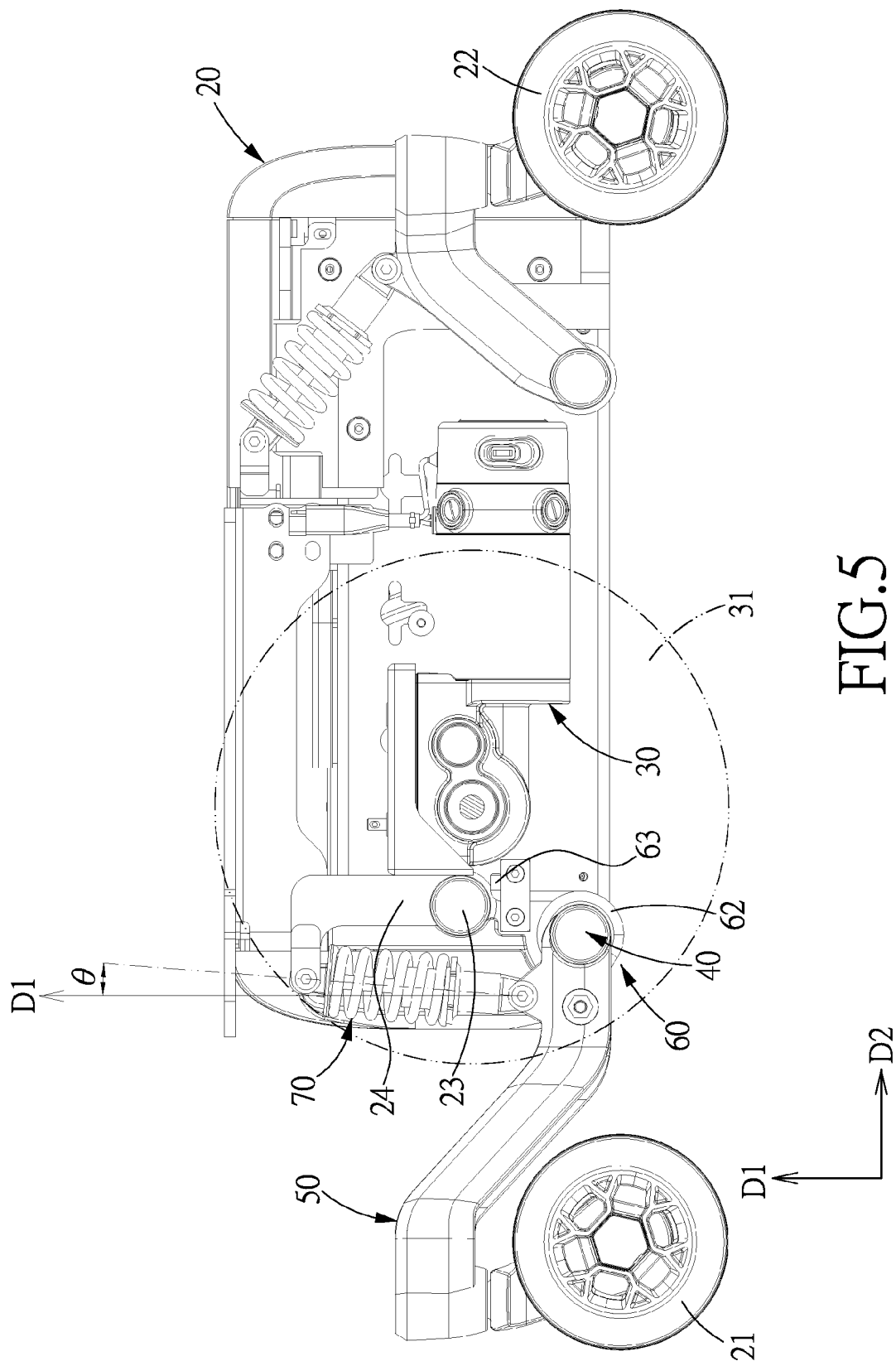
FIG. 5 is a side view of the front suspension system for an electric wheelchair in accordance with the present invention.
Figure 6:
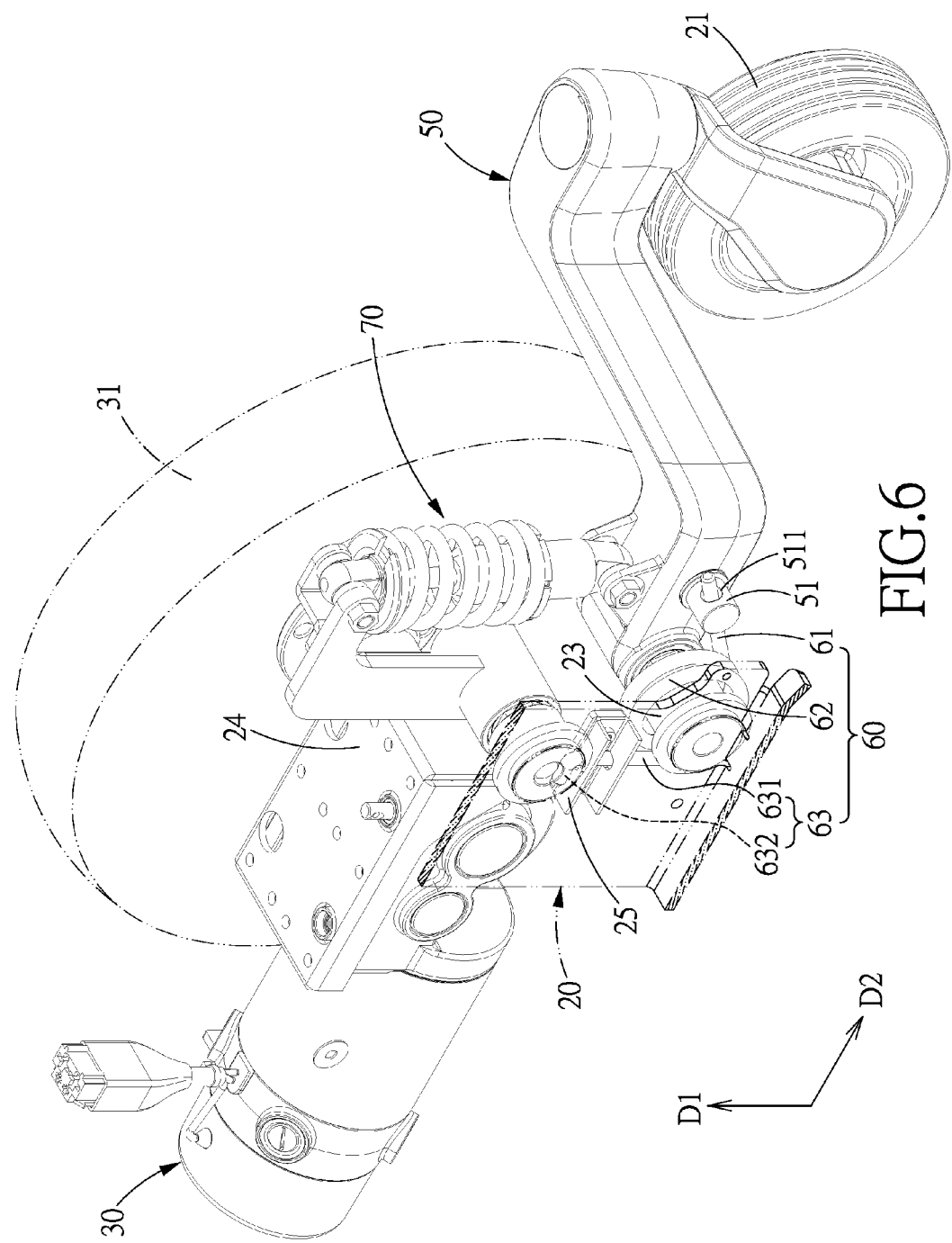
FIG. 6 is a perspective view of a part of the front suspension system for an electric wheelchair in accordance with the present invention.
Figure 7:
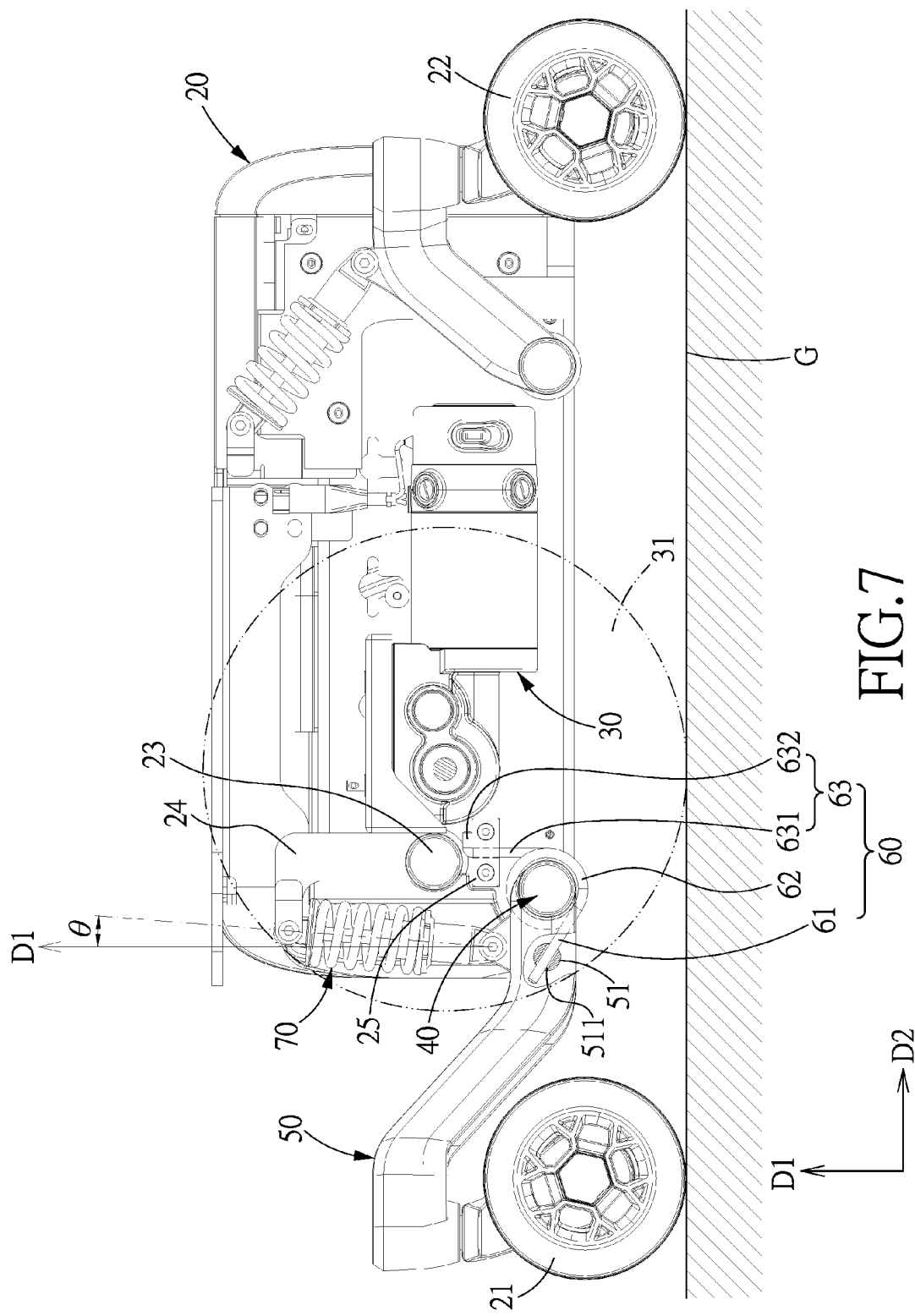
FIG. 7 is an illustrative view showing that a wheelchair equipped with the front suspension system of the present invention is placed on a flat bearing surface.

As shown in FIGS. 5 and 7, when the frame 20 of a wheelchair equipped with the front suspension system of the present invention is placed on a flat bearing surface G, the drive wheels 31, front wheels 21 and the rear wheels 22 are flatly abutted against the flat bearing surface G.

Figure 8:
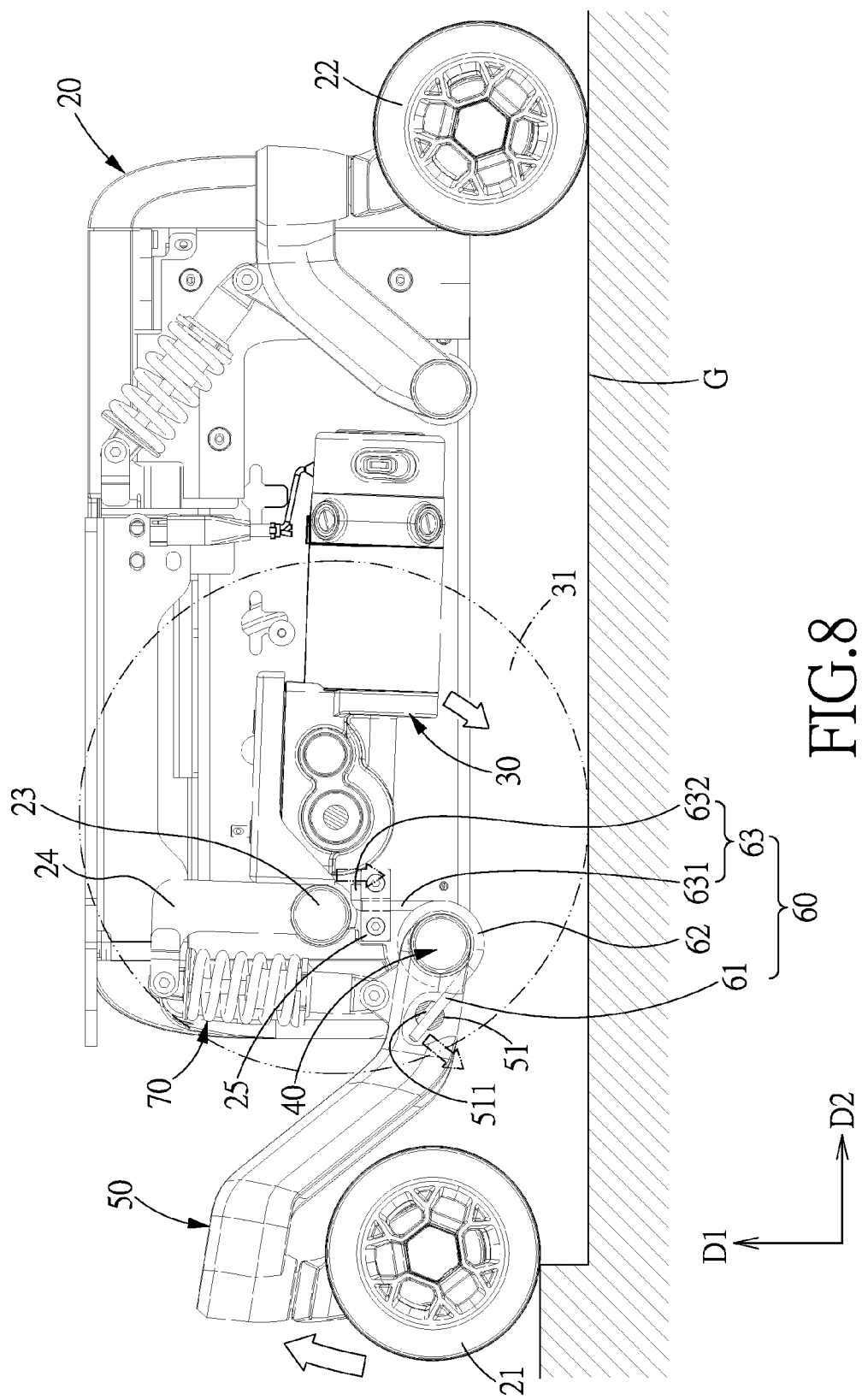
FIG. 8 is an illustrative view showing that a wheelchair equipped with the front suspension system of the present invention encounters an upraised obstacle.

When the frame 20 encounters an upraised obstacle, as shown in FIG. 8, the drive wheels 31 drive the frame 20 to move forward, the front wheels 21 will come into contact with the upraised obstacle first. The driving force of the drive wheels 31 drives the front wheels 21 and the front wheel retainers 50 to pivot upward around the front pivot shafts 40, making the front wheels 21 move up onto the obstacle. When each of the front pivot shafts 40 is pivoting upward, the corresponding front wheel retainer 50 will move and cause movement of the driving section 61 of the elasticity resistance member 60 which is fixed to the driving portion 51. When the front wheel retainer 50 pivots upward, the driving section 61 will compress the elasticity resistance section 62 of the elasticity resistance member 60, which makes the driving section 61 produce a downward pressing force toward the front wheel retainer 50, and makes the stop section 63 produce a downward pressing force toward the abutting member 25 of the frame 20. Although the front wheels 21 have moved up onto the obstacle, the elasticity resistance member 60 will produce a downward pressing force toward the front wheel retainer 50 and the abutting member 25 of the frame 20, respectively, so that the front wheel retainer 50 is pressed down to keep pressing against the flat bearing surface G, and the frame 20 is also pressed downward to prevent tipping backward. Therefore, the gripping ability of the frame 20 is enhanced, and the safety of the wheelchair is accordingly improved.

The upward pivoting motion of the front wheel retainer 50 also causes compression of the front shock absorber 70, which consequently causes the upward pivoting of one side of the assembling frame 24 fixed to the front shock absorber 70, and causes another side of the assembling frame 24 to pivot downward around the pivot 23. Hence, the upward pivoting motion of the front wheel retainer 50 can be counteracted by compression of the front shock absorber 70 and the downward pivoting motion of the assembling frame 24, namely, the force making the front wheel retainers 50 continuously pivot upward is counteracted, thus preventing the frame 20 from tipping backward.

Figure 9:
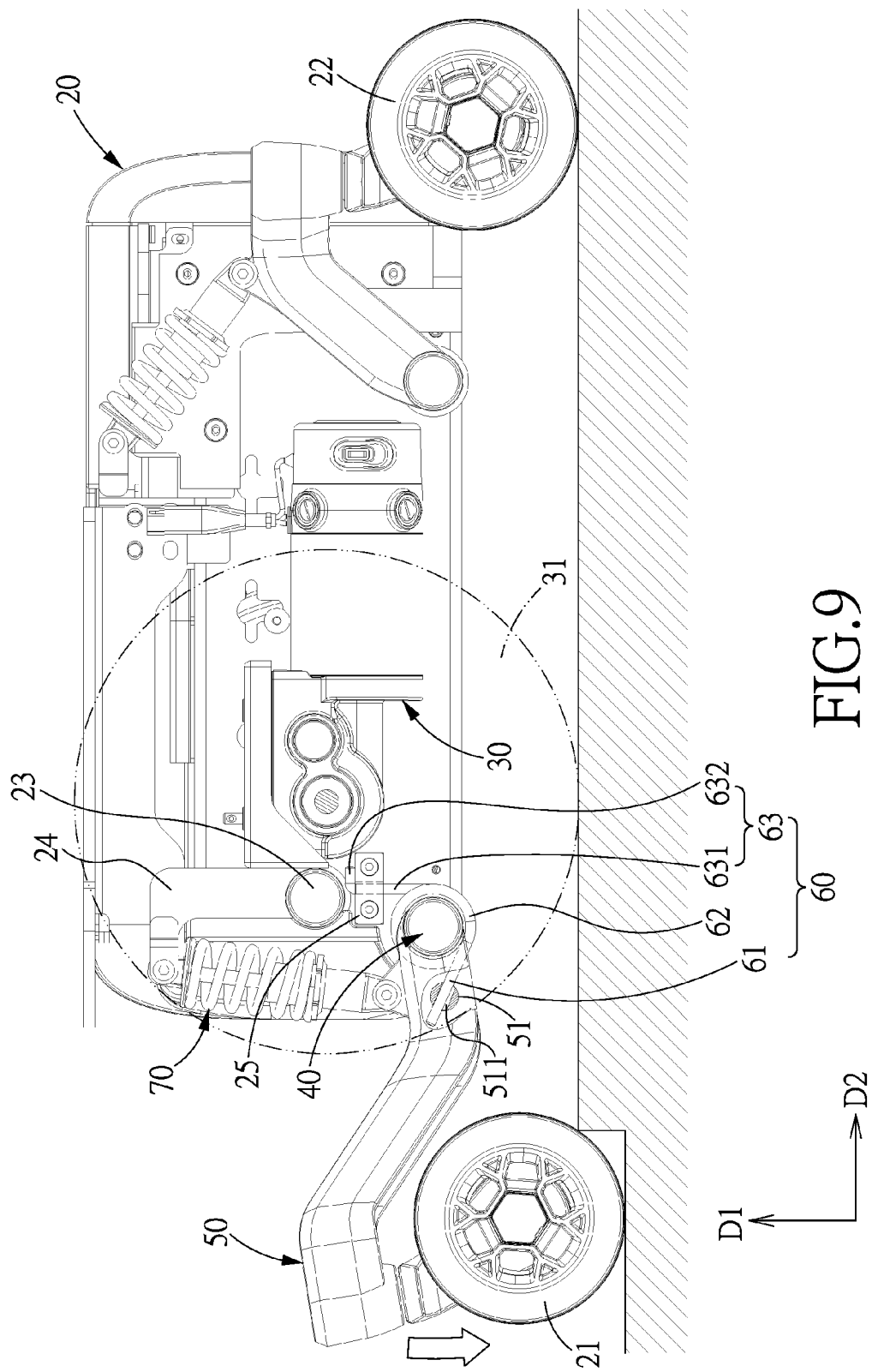
FIG. 9 is an illustrative view showing that a wheelchair equipped with the front suspension system of the present invention encounters a sunken obstacle.

When the frame 20 encounters a sunken obstacle, as shown in FIG. 9, the drive wheels 31 drive the frame 20 to move forward, the front wheels 21 will come into contact with the sunken obstacle first. When the front wheels 21 move down to the sunken obstacle and are located at a different level with respect to the drive wheels 31 and the rear wheels 22, the front shock absorber 70 will be stretched to maintain the frame 20, the drive wheels 31 and the rear wheels 22 at their original height, so as to stabilize the wheelchair.

When each of the front wheels 21 moves down to the sunken obstacle, the corresponding front wheel retainer 50 will pivot downward around the front pivot shaft 40 to compress the driving section 61 of the elasticity resistance member 60. As a result, the elasticity resistance member 60 will produce a reaction force toward the frame 20 and the front wheel retainer 50, thus making the front wheels 21 keep pressing against the surface of the sunken obstacle, and preventing the frame 20 from tipping backward. By such arrangements, the gripping performance of the wheelchair of the present invention is enhanced, the possibility of tipping backward when moving on a bumpy road is substantially reduced, and safety is also improved accordingly.

It is understood from the above description that, when the front wheel retainer 50 and the front wheels 21 encounter a bumpy road, the elasticity resistance member 60 can produce reaction forces to prevent the frame 20 from tipping over, so as to improve safety of the wheelchair. Besides, the front shock absorber 70 can also slow down the up and down motion of the frame 20, so as to improve the sitting comfort of the seat A of the frame 20.

While we have shown and described various embodiments in accordance with the present invention, it is clear to those skilled in the art that further embodiments may be made without departing from the scope of the present invention.

What is claimed is:

1. A front suspension system for an electric wheelchair being assembled onto a frame of the electric wheelchair, the electric wheelchair including a seating disposed on the frame, two front wheels and two rear wheels disposed at a front end and a rear end of the frame, respectively, an assembly frame connected to each of two sides of the frame between the front and rear ends of the frame via a pivot, a drive unit being fixed to each of the assembling frames and located at one side of the corresponding pivot, and a drive wheel coupled to each of the drive units, each of the front wheels being connected to the frame via a front suspension system, the front suspension system comprising a front pivot shaft with one end fixed to the frame, and a front wheel retainer with one end pivoted to another end of the front pivot shaft, the front wheel retainer having another end fixed to a corresponding one of the front wheels, the front suspension system being characterized in that:

an abutting member is on the frame;

a surface of the front wheel retainer faces toward the frame and is formed with a driving portion;

an elasticity resistance member is disposed between the frame and the front wheels retainer, the elasticity resistance member is sequentially formed with a driving section, an elasticity resistance section and a stop section, the elasticity resistance section is a spiral structure, and the driving section and the stop section are connected to two ends of the elasticity resistance section, respectively, and extend in two different directions, the elasticity resistance member is sleeved onto the front pivot shaft and located between the frame and the front wheel retainer, the driving section of the elasticity resistance member is connected to the driving portion of the front wheel retainer, and the stop section is stopped against the abutting member, the stop section includes an extending portion and a force applying portion, a direction along which the extending portion extends is defined as a first direction, and a direction perpendicular to the first direction is defined as a second direction, the force applying force extends in the second direction, and the force applying portion of the stop section is stopped against the abutting member; and a front shock absorber has one end pivoted to the front wheel retainer, and has another end pivoted to another side of the pivot of the assembling frame, an axis of the front shock absorber is located at angle ranging from 0-10 degrees with respect to the first direction.

2. The front suspension system for the electric wheelchair as claimed in claim 1, wherein the angle is 4-6 degrees.

3. The front suspension system for the electric wheelchair as claimed in claim 1, wherein the driving portion is formed with a through hole in which is inserted the driving section.

4. The front suspension system for the electric wheelchair as claimed in claim 1, wherein a position of the front pivot shaft on the frame in a first direction is lower than a position of the abutting member on the frame in the first direction.

* * * * *